DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1047

T887,026
FLOW CONTROLLER
John R. Stevens, Montague, Mich., assignor to E. I. du Pont de Nemours and Company, Wilmington, Del.
Filed June 26, 1970, Ser. No. 50,101
**Int. Cl. B65g *47/00***
U.S. Cl. 198—45
1 Sheet Drawing. 8 Pages Specification

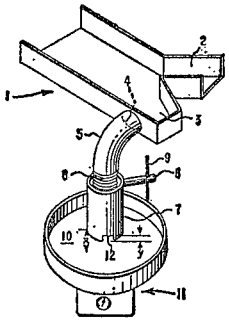

A feed controller for providing a uniform flow of articles which consists essentially of (a) a first vibratory conveyor having an aperture for the discharge of particulate matter, (b) a second vibratory conveyor, preferably a circular track two plane vibratory feeder, (c) a vertical flexible open flow tube connecting to said first conveyor through said aperture and leading to the surface of said second conveyor, and (d) an independently supported guide tube positioned around the flow tube so that the flow tube is free to move within said guide tube, said guide tube extending to a point below the discharge end of the flow tube and immediately above the surface of the second conveyor, the height of the guide tube above the surface of the second conveyor being determined by the desired depth of articles to be fed to the second conveyor and being at a minimum about the minimum dimension of the articles to be fed and at a maximum about one and one-half times the minimum dimension of the articles, said guide tube having a feed aperture positioned below the discharge end of the flow tube and immediately above the surface of the second vibratory conveyor, said aperture being wider than the greatest dimension of the articles to be fed and having a height of about one to two times the minimum dimension of the articles.

June 22, 1971 J. R. STEVENS ET AL T887,026
FLOW CONTROLLER
Filed June 26, 1970
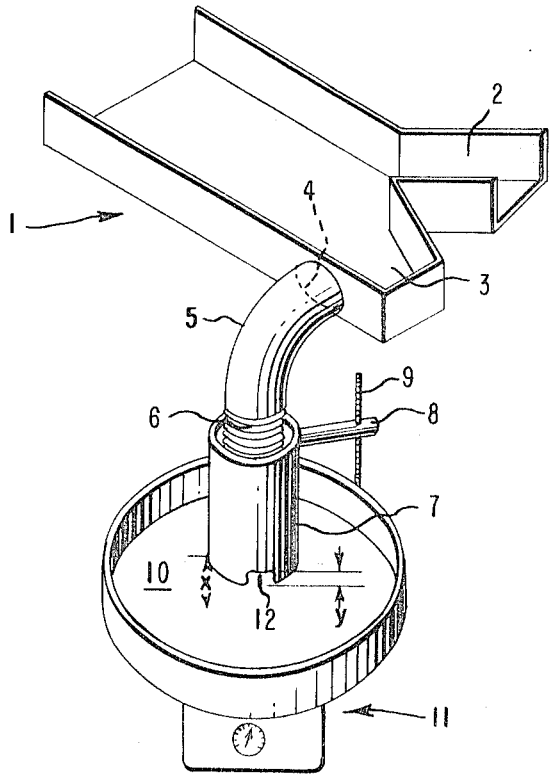
INVENTOR
JOHN R. STEVENS
BY
ATTORNEY